US010936306B2

(12) United States Patent
Miyake et al.

(10) Patent No.: US 10,936,306 B2
(45) Date of Patent: Mar. 2, 2021

(54) VEHICLE CONTROL SYSTEM AND SOFTWARE COMPATIBILITY CHECKING METHOD

(71) Applicant: TOYOTA JIDOSHA KABUSHIKI KAISHA, Toyota (JP)

(72) Inventors: Masaki Miyake, Toyota (JP); Teppei Fukuzawa, Toyota (JP); Shuji Matsuno, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/282,933

(22) Filed: Feb. 22, 2019

(65) Prior Publication Data

US 2019/0278588 A1  Sep. 12, 2019

(30) Foreign Application Priority Data

Mar. 7, 2018  (JP) ................................ 2018-040983

(51) Int. Cl.
*G06F 8/71* (2018.01)
*B60R 16/023* (2006.01)

(52) U.S. Cl.
CPC .............. *G06F 8/71* (2013.01); *B60R 16/023* (2013.01)

(58) Field of Classification Search
CPC ....................................................... G06F 8/71
(Continued)

(56) References Cited

U.S. PATENT DOCUMENTS 8,694,982 B2 *  4/2014  Wempen .................. G06F 8/65
717/168
9,384,084 B2 *  7/2016  Persson ................. G06F 9/4411
(Continued)

FOREIGN PATENT DOCUMENTS

JP  2009-53920 A  3/2009

OTHER PUBLICATIONS

Mansor et al.; "Don't Brick Your Car: Firmware Confidentiality and Rollback for Vehicles"; 10th International Conference on Availability, Reliability and Security (ARES 2015), pp. 139-148, 2015 (Year: 2015).*
(Continued)

*Primary Examiner* — Qing Chen
*Assistant Examiner* — Clint Thatcher
(74) *Attorney, Agent, or Firm* — Oliff PLC

(57) ABSTRACT

A vehicle control system includes a plurality of in-vehicle devices. Each of the in-vehicle devices includes a compatibility information storing unit that stores compatibility information including an allowable combination of software versions of all the in-vehicle devices constituting the vehicle control system. A particular in-vehicle device as one of the in-vehicle devices includes an obtaining unit that obtains software versions of the other in-vehicle devices, and compatibility information held by the other in-vehicle devices, a compatibility information specifying unit that specifies proper compatibility information, from the compatibility information stored in the particular in-vehicle device, and the compatibility information obtained from the other in-vehicle devices, and a determining unit that determines whether the software versions of all the in-vehicle devices constituting the vehicle control system are compatible, by checking the software version of the particular in-vehicle
(Continued)

device, and those obtained from the other in-vehicle devices, against the proper compatibility information.

8 Claims, 6 Drawing Sheets

(58) Field of Classification Search
USPC .......................................................... 717/170
See application file for complete search history.

(56) References Cited

U.S. PATENT DOCUMENTS

| | | | |
|---|---|---|---|
| 2014/0075197 A1* | 3/2014 | Alrabady | G06F 8/65 |
| | | | 713/176 |
| 2014/0282470 A1* | 9/2014 | Buga | G06F 8/65 |
| | | | 717/170 |
| 2016/0170775 A1* | 6/2016 | Rockwell | G06F 13/4282 |
| | | | 713/100 |
| 2017/0060559 A1* | 3/2017 | Ye | G06F 8/65 |

OTHER PUBLICATIONS

"About Incompatible Software on your Mac"; Apple.com support webpage [full URL in ref.] as captured by the Wayback Machine Internet Archive on Jul. 12, 2016 (Year: 2016).*

* cited by examiner ns of the respective in-vehicle devices does not match a combination of software versions subjected in advance to checking of operation, unexpected vehicle control may be performed. Accordingly, it is important for the system consisting of a plurality of in-vehicle devices to check compatibility of the software versions of the in-vehicle devices.

VEHICLE CONTROL SYSTEM AND SOFTWARE COMPATIBILITY CHECKING METHOD

INCORPORATION BY REFERENCE

The disclosure of Japanese Patent Application No. 2018-040983 filed on Mar. 7, 2018 including the specification, drawings and abstract is incorporated herein by reference in its entirety.

BACKGROUND

1. Technical Field

The disclosure relates to a vehicle control system, and a software compatibility checking method.

2. Description of Related Art

In recent years, various types of automated driving systems have been developed. One example of the automated driving systems consists of a plurality of in-vehicle devices that are combined together to perform vehicle control, such as acceleration, deceleration, and steering. In a system consisting of a plurality of in-vehicle devices, like the automated driving system, when a combination of software versions of the respective in-vehicle devices does not match a combination of software versions subjected in advance to checking of operation, unexpected vehicle control may be performed. Accordingly, it is important for the system consisting of a plurality of in-vehicle devices to check compatibility of the software versions of the in-vehicle devices.

For example, in a system consisting of a plurality of electronic control units (ECUs) as described in Japanese Patent Application Publication No. 2009-53920 (JP 2009-53920 A), before a program of one of the ECUs is updated, it is determined whether the program can be updated, referring to information on the dependence relationship between an upgrade program of the ECU having the program to be updated, and programs of the other ECUs, so as to reduce the possibility of occurrence of a failure in operation due to incompatibility of versions among the programs of the ECUs.

SUMMARY

When the compatibility of software versions of a plurality of in-vehicle devices is checked, the vehicle may not be placed in an environment that permits wireless communications. Thus, the process of checking compatibility of software versions of a plurality of in-vehicle devices in a vehicle control system consisting of the in-vehicle devices is likely to be performed within the vehicle control system, without requiring the system to communicate with an external server, or the like.

This disclosure provides a vehicle control system that can check compatibility of software versions of all in-vehicle devices that constitute the vehicle control system, even in the case where the vehicle is not placed in an environment that permits wireless communications. The disclosure also provides a software compatibility checking method for use in the vehicle control system.

A vehicle control system according to a first aspect of the disclosure includes a plurality of in-vehicle devices. Each of the in-vehicle devices includes a compatibility information storing unit configured to store compatibility information including an allowable combination of software versions of all of the in-vehicle devices that constitute the vehicle control system. One of the in-vehicle devices is a particular in-vehicle device, and the particular in-vehicle device includes an obtaining unit configured to obtain software versions of the other in-vehicle devices, and compatibility information held by the other in-vehicle devices, a compatibility information specifying unit configured to specify proper compatibility information, from the compatibility information stored in the compatibility information storing unit of the particular in-vehicle device, and the compatibility information obtained from the other in-vehicle devices, and a determining unit configured to determine whether the software versions of all of the in-vehicle devices that constitute the vehicle control system are compatible, by checking a software version of the particular in-vehicle device, and the software versions obtained from the other in-vehicle devices, against the proper compatibility information.

According to the above aspect, the vehicle control system can autonomously check compatibility of software versions, without communicating with external equipment outside the vehicle, based on the compatibility information held by each of the in-vehicle devices that constitute the vehicle control system.

In the above aspect, each of the in-vehicle devices may be configured to hold compatibility information of a current version and compatibility information of an old version, and the obtaining unit may be configured to obtain the compatibility information of the current version and the compatibility information of the old version from each of the other in-vehicle devices. The compatibility information specifying unit may be configured to specify the proper compatibility information, based on the compatibility information of the current version and the compatibility information of the old version which are stored in the compatibility information storing unit of the particular in-vehicle device, and the compatibility information of the current version and the compatibility information of the old version which are obtained from each of the other in-vehicle devices.

With the above configuration, the proper compatibility information is specified from the compatibility information of the current versions and the compatibility information of the old versions, which are held by the respective in-vehicle devices. It is thus possible to specify more proper compatibility information with high accuracy, in view of the update history of the compatibility information.

In the above aspect, the compatibility information specifying unit may be configured to specify the latest compatibility information as the proper compatibility information. The latest compatibility information is included in the compatibility information stored in the compatibility information storing unit of the particular in-vehicle device, and the compatibility information obtained from the other in-vehicle devices.

With the above configuration, it can be determined whether the combination of software versions, which are the newest versions, achieves compatibility, based on the latest compatibility information included in the compatibility information held by the respective in-vehicle devices.

In the above aspect, the compatibility information specifying unit may be configured to specify the most frequent compatibility information as the proper compatibility information. The most frequent compatibility information is the same compatibility information most often included in the compatibility information stored in the compatibility information storing unit of the particular in-vehicle device, and the compatibility information obtained from the other in-vehicle devices.

With the above configuration, compatibility information that is highly probable to be proper can be easily specified.

In the above aspect, the particular in-vehicle device may further include an update instructing unit configured to instruct any of the in-vehicle devices having software of a version that does not match the proper compatibility information, to update the software, when the determining unit determines that the software versions of all of the in-vehicle devices that constitute the vehicle control system lack compatibility.

With the above configuration, when the software versions of all of the in-vehicle devices that constitute the vehicle control system lack compatibility, updating of the software of the incompatible version is promoted, so that the system can be promptly brought back into a condition where the software versions of the in-vehicle devices are compatible.

In the above aspect, the determining unit may be configured to perform a determining process each time a power supply of a vehicle is turned on. With this configuration, each time the power supply of the vehicle is turned on, the system checks whether the software versions of all of the in-vehicle devices that constitute the vehicle control system are compatible; therefore, it is possible to further reduce the possibility of execution of unexpected vehicle control due to lack of compatibility among the software versions of the in-vehicle devices.

A second aspect of the disclosure is concerned with a method of checking compatibility of software used in a vehicle control system including a plurality of in-vehicle devices. The method includes a step of storing in advance, by a computer of each of the in-vehicle devices, compatibility information including an allowable combination of software versions of all of the in-vehicle devices that constitute the vehicle control system, a step of obtaining, by a computer of a particular in-vehicle device as one of the in-vehicle devices, software versions of the other in-vehicle devices, and compatibility information held by the other in-vehicle devices, a step of specifying, by the computer of the particular in-vehicle device, proper compatibility information, from the compatibility information stored in the particular in-vehicle device, and the compatibility information obtained from the other in-vehicle devices, and a step of determining, by the computer of the particular in-vehicle device, whether the software versions of all of the in-vehicle devices that constitute the vehicle control system are compatible, by checking the software version of the particular in-vehicle device, and the software versions obtained from the other in-vehicle devices, against the proper compatibility information.

According to the above aspect, the vehicle control system can autonomously check compatibility of software versions, without communicating with external equipment outside the vehicle, based on the compatibility information held by each of the in-vehicle devices that constitute the vehicle control system.

The first aspect or second aspect of the disclosure can provide the vehicle control system that can check compatibility of the software versions of all of the in-vehicle devices that constitute the vehicle control system, even in the case where the vehicle is not placed in an environment that permits wireless communications, and the software compatibility checking method.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle control system according to one aspect of the disclosure consists of a plurality of in-vehicle devices, and checks whether software versions of all of the in-vehicle devices that constitute the vehicle control system are compatible, based on compatibility information held by the in-vehicle devices. All of the in-vehicle devices hold compatibility information used for checking compatibility, and the system checks compatibility, using proper compatibility information specified from all the compatibility information. Accordingly, the vehicle control system according to the aspect of the disclosure is able to autonomously check compatibility of the software versions, without communicating with external equipment outside the vehicle.

Figure 1:
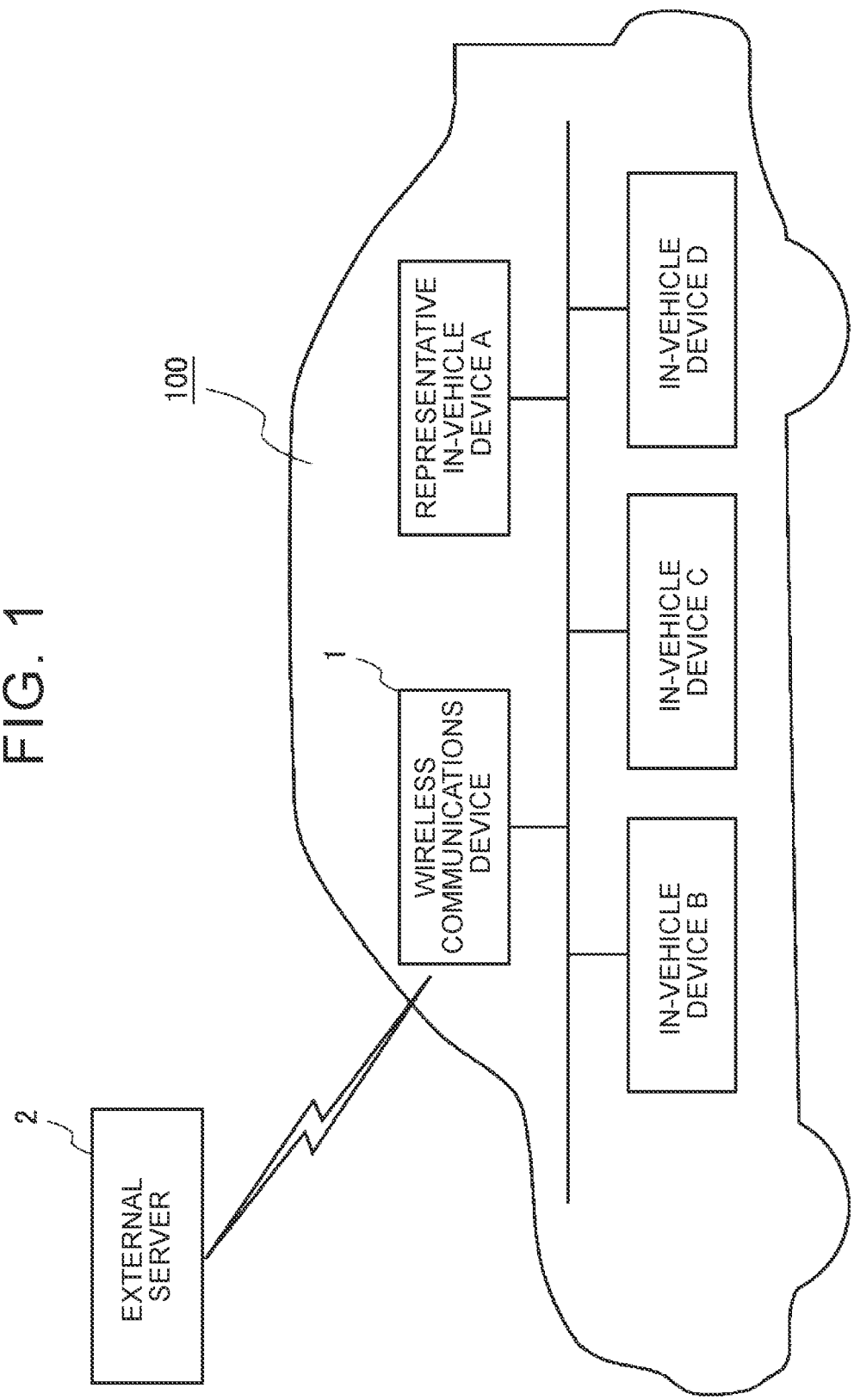
FIG. 1 is a block diagram schematically showing the configuration of a vehicle control system according to one embodiment.

FIG. 1 is a block diagram schematically showing the configuration of a vehicle control system according to one embodiment.

The vehicle control system 100 consists of in-vehicle devices A to D capable of communicating with each other, and implements predetermined vehicle control, by combining respective functions of the in-vehicle devices A to D. While the vehicle control system 100 consists of four in-vehicle devices A to D in the example of FIG. 1, the number of in-vehicle devices that constitute the vehicle control system 100 is not limited to four. One example of the predetermined vehicle control implemented by the vehicle control system 100 is automated driving. The in-vehicle devices A to D correspond to electronic control units (ECUs) that control vehicle travelling, such as acceleration, deceleration, and steering, and ECU that performs travelling assistance with a combination of the ECUs that control vehicle traveling. The in-vehicle devices A to D can also communicate with an external server 2, via a wireless communications device 1. In the following description, a particular in-vehicle device A as one of the in-vehicle devices A to D that constitute the vehicle control system will be called "representative in-vehicle device A".

Figure 2:
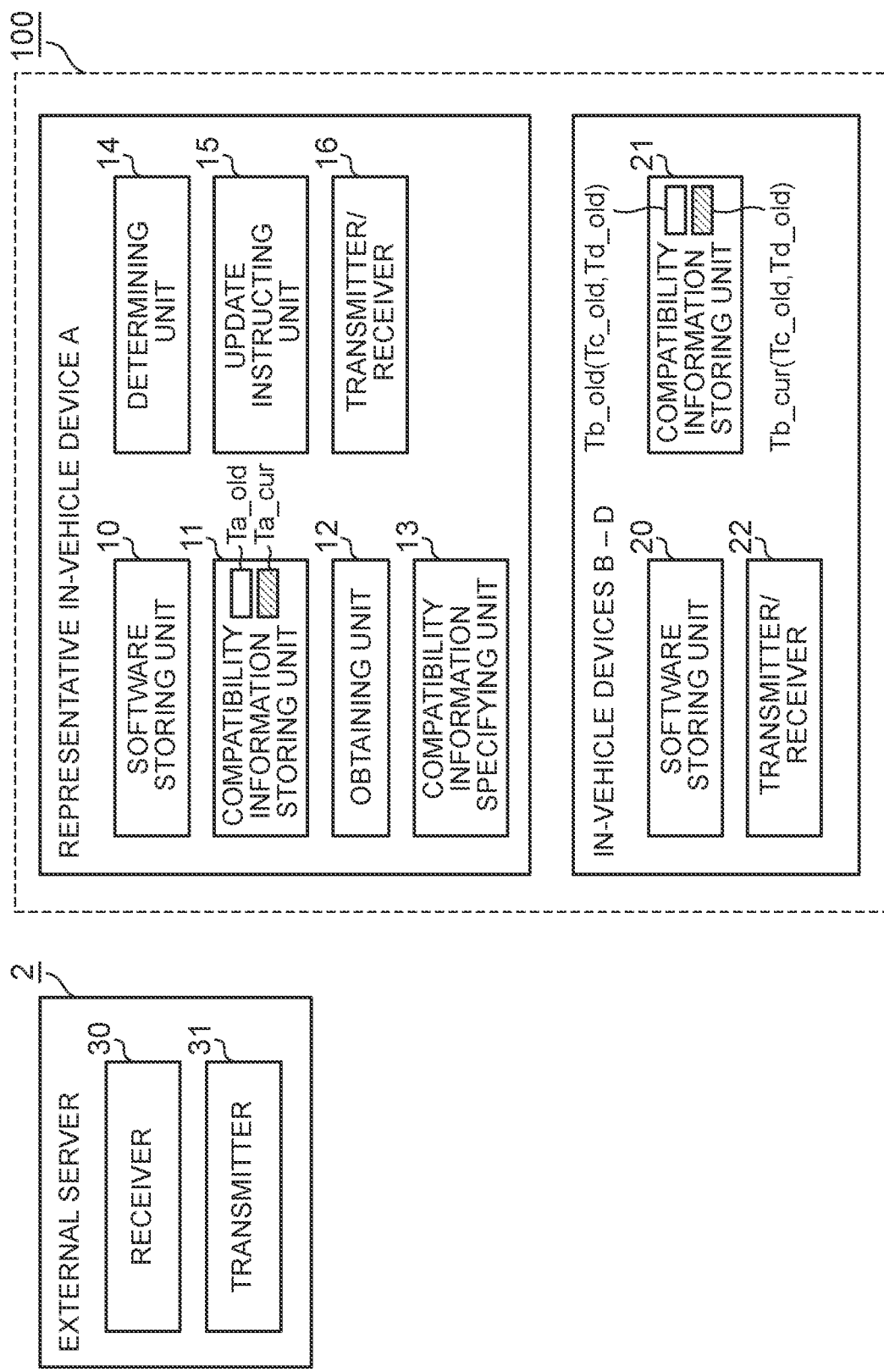
FIG. 2 is a functional block diagram of the vehicle control system shown in FIG. 1.

FIG. 2 is a functional block diagram of the vehicle control system shown in FIG. 1, and FIG. 3 to FIG. 5 are views useful for describing a method of determining compatibility of software versions according to one embodiment.

The representative in-vehicle device A is one of the in-vehicle devices that provide control functions of the vehicle control system 100, and functions as a master device, in a process for checking compatibility of the software versions of the in-vehicle devices A to D. The representative in-vehicle device A checks compatibility of the software versions of all of the in-vehicle devices A to D that constitute the vehicle control system 100, when a power supply of the vehicle is turned on. The representative in-vehicle device A includes a software storing unit 10, compatibility information storing unit 11, obtaining unit 12, compatibility information specifying unit 13, determining unit 14, update instructing unit 15, and transmitter/receiver 16.

The software storing unit 10 stores software for operating the representative in-vehicle device A. The representative in-vehicle device A executes the software stored in the software storing unit 10, so as to fulfill a predetermined function for controlling operation of the vehicle.

Figure 3:
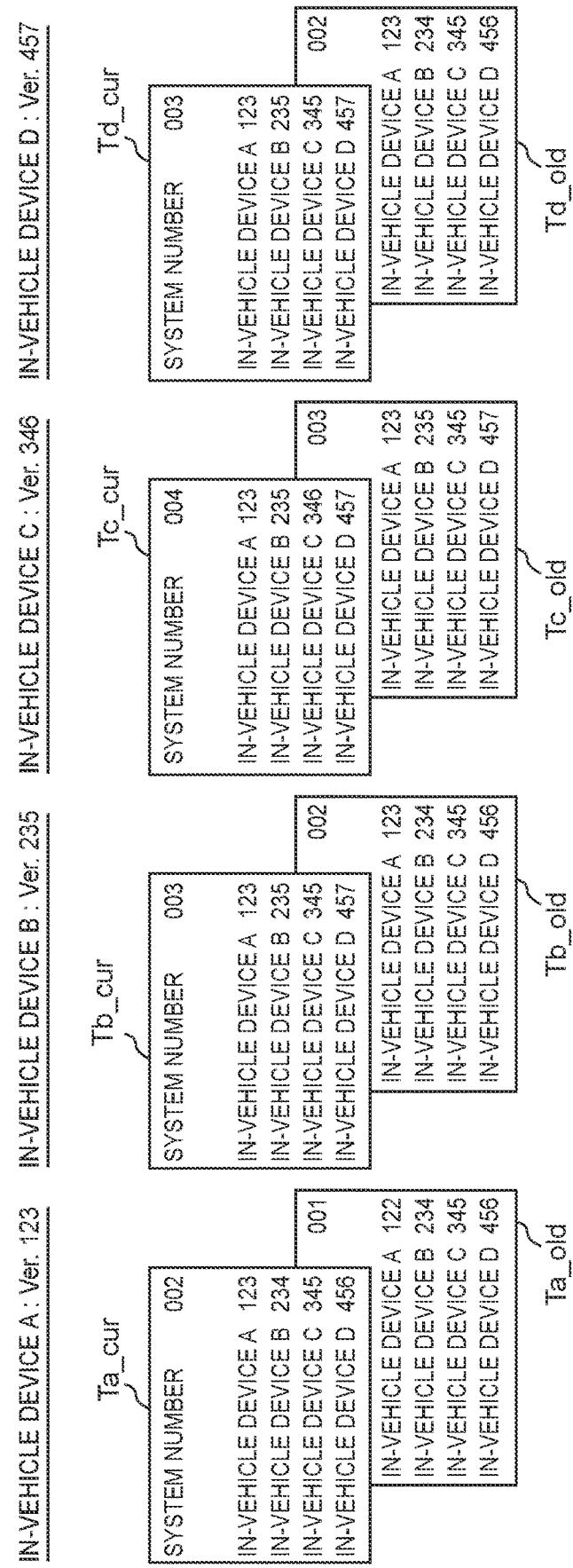
FIG. 3 is a view useful for describing a method of determining compatibility of software versions according to one embodiment.

The compatibility information storing unit 11 stores, in advance, a compatibility table Ta_cur of a current version and a compatibility table Ta_old of an old version, as compatibility information used for determining whether the software versions of all of the in-vehicle devices A to D that constitute the vehicle control system 100 are compatible. In each compatibility table, a combination of software versions of all of the in-vehicle devices A to D that constitute the vehicle control system 100 is defined. The combination of software versions of the in-vehicle devices A to D is a combination of versions that are allowed to be executed at the same time, while ensuring that the vehicle control system 100 operates normally. For example, each of the compatibility tables Ta_cur and Ta_old may include a system number that specifies a version of the vehicle control system 100, and respective software versions of the in-vehicle devices A to D, as shown in FIG. 3. While a single version is defined as a version of each in-vehicle device, in the example of the compatibility tables of FIG. 3, a range of versions of each in-vehicle device, which can be combined with those of the other in-vehicle devices, may be defined. Also, in the compatibility table, two or more sets or combinations of versions (or version ranges) allowed to be executed at the same time may be defined. In the case where one in-vehicle device holds two or more pieces of software, allowable versions of the respective pieces of software may be defined in the compatibility table.

The compatibility table Ta_cur is updated as the software stored in the software storing unit 10 is updated. Upon updating, the compatibility table Ta_old of the old version is deleted, and the compatibility table Ta_cur of the current version is held as the compatibility table Ta_old of the old version, while the updated compatibility table is newly stored as the compatibility table Ta_cur of the current version. Since the compatibility table Ta_cur is updated in accordance with software updating, the version of the in-vehicle device A defined in the compatibility table Ta_cur coincides with the version of the software stored in the software storing unit 10.

Like the representative in-vehicle device A, the other in-vehicle devices B to D also store, in advance, compatibility tables (Tb_cur, Tc_cur, and Td_cur of FIG. 3) of the current versions, and compatibility tables (Tb_old, Tc_old, and Td_old of FIG. 3) of the old versions, though details will be described later.

The obtaining unit 12 obtains the respective software versions of the other in-vehicle devices B to D, and the compatibility tables Tb_cur, Tc_cur, Td_cur, Tb_old, Tc_old, and Td_old held in the other in-vehicle devices B to D. Where any of the in-vehicle devices B to D holds two or more pieces of software, the obtaining unit 12 obtains the versions of all of the pieces of software held in the in-vehicle device.

The compatibility information specifying unit 13 specifies one type of proper compatibility information, from the compatibility tables Ta_cur and Ta_old stored in the compatibility information storing unit 11 of the particular in-vehicle device A, and the compatibility tables Tb_cur, Tc_cur, Td_cur, Tb_old, Tc_old, and Td_old obtained by the obtaining unit 12 from the other in-vehicle devices B to D. A method of specifying proper compatibility information will be described later.

The determining unit 14 determines whether the software versions of all of the in-vehicle devices A to D that constitute the vehicle control system 100 are compatible. To make this determination, the determining unit 14 checks the version of the software stored in the software storing unit 10 of the representative in-vehicle device A, and the software versions obtained by the obtaining unit 12 from the other in-vehicle devices B to D, against the proper compatibility table specified by the compatibility information specifying unit 13. When the determining unit 14 determines that the software versions of all of the in-vehicle devices A to D that constitute the vehicle control system 100 are compatible, based on the specified proper compatibility table, it permits execution of predetermined vehicle control implemented by combining the functions of the in-vehicle devices A to D.

When the determining unit 14 determines that the software versions of all of the in-vehicle devices A to D that constitute the vehicle control system 100 lacks compatibility, the update instructing unit 15 instructs the in-vehicle device that holds software whose version does not match the version defined in the proper compatibility table, to update the software.

The transmitter/receiver 16 communicates with the other in-vehicle devices B to D, so as to send and receive various kinds of information to and from the devices B to D. Also, the transmitter/receiver 16 communicates with the external server 2, via the wireless communications device 1 shown in FIG. 1, so as to send and receive various kinds of information. When the update instructing unit 15 determines that the software of the representative in-vehicle device A needs to be updated, the transmitter/receiver 16 sends a request for updating software, to the external server 2, and receives updated software and an updated compatibility table transmitted from the external server 2.

Each of the in-vehicle devices B to D includes a software storing unit 20, compatibility information storing unit 21, and transmitter/receiver 22.

The software storing unit 20 stores, in advance, software for operating a corresponding one of the in-vehicle devices B to D. Each of the in-vehicle devices B to D executes the software stored in the software storing unit 20, so as to fulfill a predetermined function for controlling operation of the vehicle.

The compatibility information storing unit 21 stores, in advance, the compatibility table of the current version and the compatibility table of the old version, as compatibility information used for determining whether the software versions of all of the in-vehicle devices A to D that constitute the vehicle control system 100 are compatible. As shown in FIG. 3, the compatibility information storing units 21 of the in-vehicle devices B, C, and D store the compatibility tables Tb_cur, Tc_cur, and Td_cur of the current versions, and the compatibility tables Tb_old, Tc_old, and Td_old of the old versions, respectively. As shown in FIG. 3, the system number that specifies the version of the vehicle control system 100, and a combination of software versions of all of the in-vehicle devices A to D that constitute the vehicle control system 100 are defined in each compatibility table, as in the compatibility table of the representative in-vehicle device A. Also, as the software stored in the software storing unit 20 is updated, the compatibility table of the old version is deleted, and the compatibility table of the current version is held as the compatibility table of the old version, while the updated compatibility table is newly stored as the compatibility table of the current version, in a similar manner to the compatibility tables of the representative in-vehicle device A. With the compatibility tables thus updated in accordance with updating of software, the versions of the in-vehicle devices B, C, and D defined in the compatibility tables Tb_cur, Tc_cur, and Td_cur held by the in-vehicle devices B, C, and D coincide with the versions of software stored in the software storing units 20 of the in-vehicle devices B, C, and D, respectively.

The transmitter/receiver 22 of each of the in-vehicle devices B to D communicates with other in-vehicle devices, and sends and receives various kinds of information to and from the devices. The transmitter/receiver 22 sends the version of the software stored in the software storing unit 20, and the compatibility table of the current version and the compatibility table of the old version stored in the compatibility information storing unit 21, to the representative in-vehicle device A, at predetermined points in time. The transmitter/receiver 22 may send the software version and the compatibility tables to the representative in-vehicle device A when the power supply of the vehicle is turned on, or may send the software version and the compatibility tables to the representative in-vehicle device A, in response to a request transmitted from the representative in-vehicle device A when the power supply of the vehicle is turned on.

The external server 2 includes a receiver 30 and a transmitter 31. The receiver 30 receives a request for transmission of updated software, from the in-vehicle devices A to D. When the receiver 30 receives the request for transmission of updated software from a certain on-vehicle device, the transmitter 31 sends updated software to the in-vehicle device concerned. Referring next to FIG. 2 through FIG. 5, the method of specifying the proper compatibility table, and the method of determining compatibility of software versions, will be described.

(1) FIG. 3 shows a case where the software versions are compatible. In the example of FIG. 3, the latest compatibility table specified from among eight compatibility tables Ta_cur to Td_cur and Ta_old to Td_old is a proper one, and the software versions of the in-vehicle devices A to D match those defined in the specified proper compatibility table.

Initially, the compatibility information specifying unit 13 of the representative in-vehicle device A refers to the system numbers (system versions) of the compatibility tables Ta_cur to Td_cur obtained by the obtaining unit 12, and specifies the compatibility table Tc_cur having the latest system number "004" as the proper compatibility table.

Then, the determining unit 14 of the representative in-vehicle device A checks the software version of the representative in-vehicle device A, and the software versions of the other in-vehicle devices B to D obtained by the obtaining unit 12, against the compatibility table Tc_cur specified as the proper table, and determines whether the software versions of the in-vehicle devices A to D are compatible. In the example of FIG. 3, all of the software version "123" of the in-vehicle device A, software version "235" of the in-vehicle device B, software version "346" of the in-vehicle device C, and software version "457" of the in-vehicle device D coincide with the versions defined in the compatibility table Tc_cur. Accordingly, the determining unit 14 determines that the software versions of all of the in-vehicle devices A to D that constitute the vehicle control system 100 are compatible.

In the case shown in FIG. 3, the software versions of all of the in-vehicle devices A to D that constitute the vehicle control system 100 are compatible; therefore, vehicle control using the control functions of all of the in-vehicle devices A to D can be performed.

In this connection, it is preferable that the compatibility information specifying unit 13 also refers to the compatibility tables Ta_old to Td_old of the old versions, when it specifies the proper compatibility table. For example, in the system configured such that the system number of the compatibility table is sequentially updated with version upgrade of software of the in-vehicle device, when the system number of the compatibility table of the current version is smaller (namely, the system number is older) than the system number of the compatibility table of the old version, in a pair of compatibility tables of each in-vehicle device, the compatibility information specifying unit can determine that the compatibility table of the current version is not proper.

Figure 4:
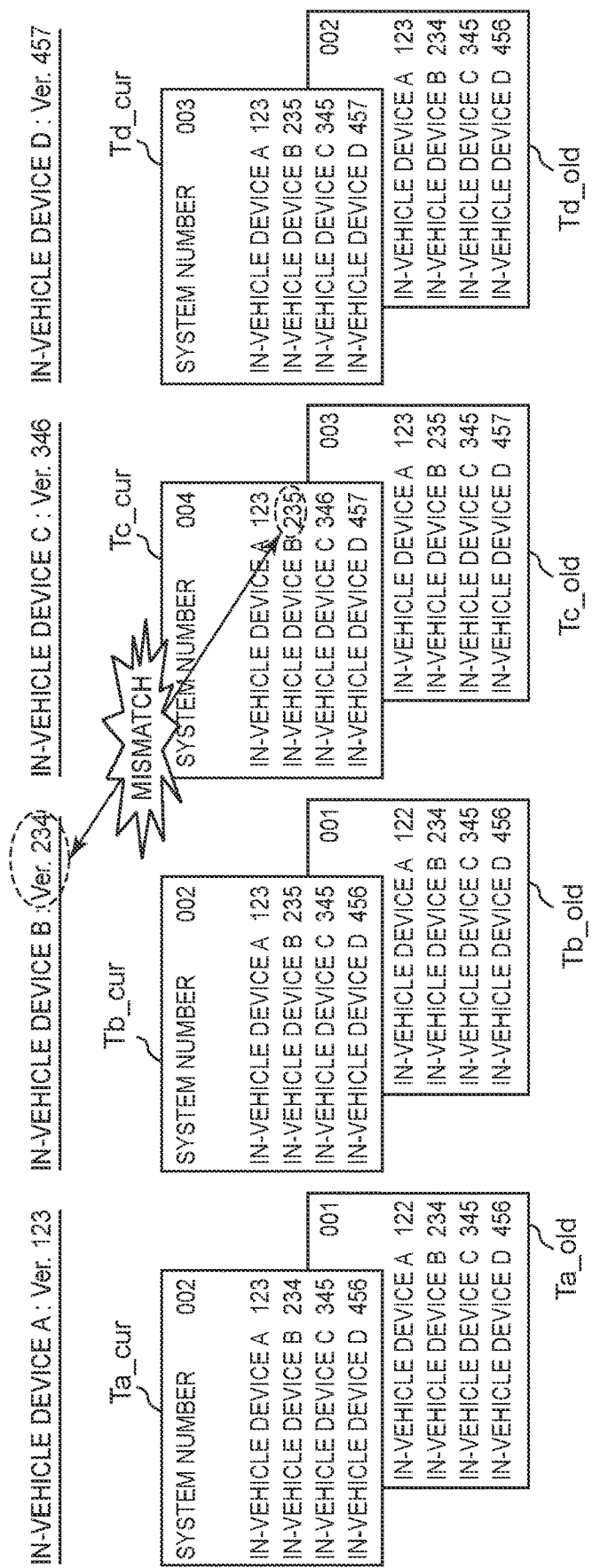
FIG. 4 is a view useful for describing the method of determining compatibility of software versions according to the embodiment.

(2) FIG. 4 shows a case where the software versions lack compatibility. In the example shown in FIG. 4, the latest compatibility table specified from among eight compatibility tables Ta_cur to Td_cur and Ta_old to Td_old is a proper one, but the software versions of the in-vehicle devices A to D do not match those defined in the proper compatibility table thus specified.

Initially, the compatibility information specifying unit 13 of the representative in-vehicle device A refers to the system numbers (system versions) of the compatibility tables Ta_cur to Td_cur obtained by the obtaining unit 12, and specifies the compatibility table Tc_cur having the latest system number "004" as the proper compatibility table.

Then, the determining unit 14 of the representative in-vehicle device A checks the software version of the representative in-vehicle device A, and the software versions of the other in-vehicle devices B to D obtained by the obtaining unit 12, against the compatibility table Tc_cur specified as the proper table, and determines whether the software versions of the in-vehicle devices A to D are compatible. In the example of FIG. 4, the software version "123" of the in-vehicle device A, software version "346" of the in-vehicle device C, and software version "457" of the in-vehicle device D coincide with the versions defined in the compatibility table Tc_cur, but the software version "234" of the in-vehicle device B does not match the version defined in the compatibility table Tc_cur. Accordingly, the determining unit 14 determines that the software versions of all of the in-vehicle devices A to D that constitute the vehicle control system 100 lack compatibility.

In the case shown in FIG. 4, the software versions of all of the in-vehicle devices A to D that constitute the vehicle control system 100 lack compatibility; therefore, vehicle control using the control functions of all of the in-vehicle devices A to D is inhibited from being performed, and the update instructing unit 15 instructs the in-vehicle device B to update its software. Once it is determined that the software versions of all of the in-vehicle devices A to D that constitute the vehicle control system 100 are compatible, in a compatibility checking process executed after updating of software of the in-vehicle device B, it becomes possible to perform vehicle control using the control functions of all of the in-vehicle devices A to D.

Figure 5:
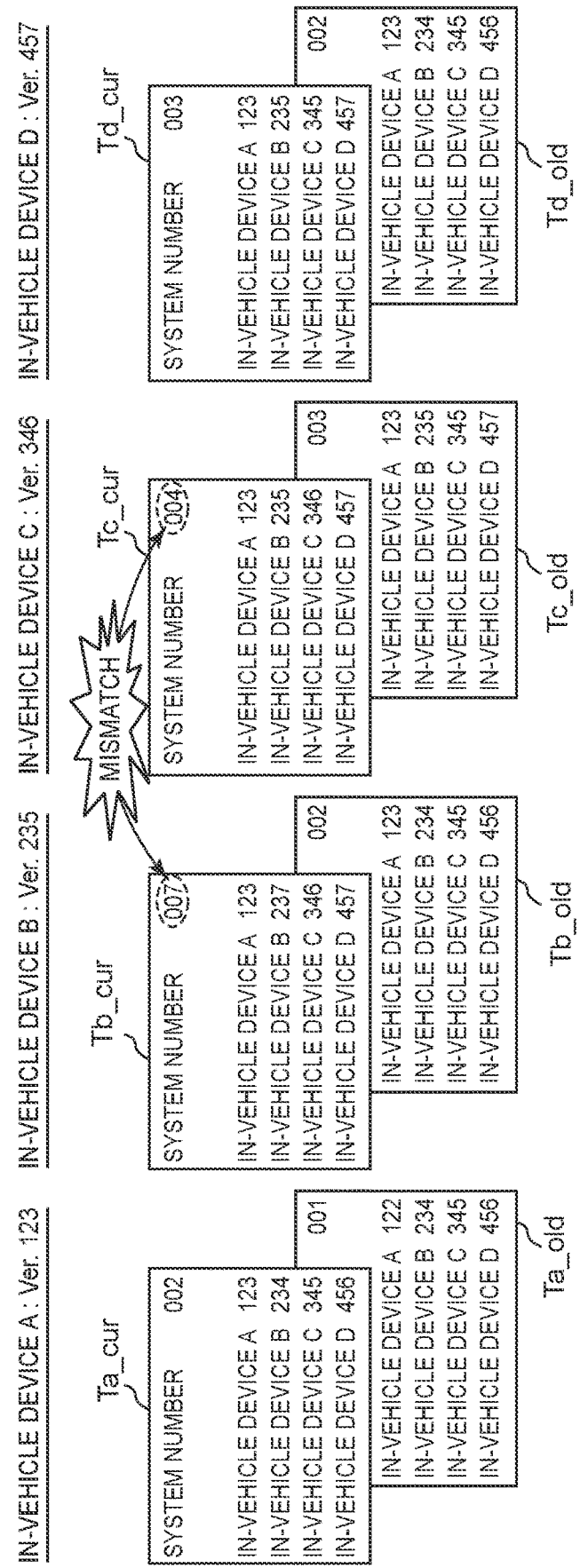
FIG. 5 is a view useful for describing the method of determining compatibility of software versions according to the embodiment.

(3) FIG. 5 shows a case where an improper compatibility table is included. In the example shown in FIG. 5, an improper compatibility table is included in eight compatibility tables Ta_cur to Td_cur and Ta_old to Td_old, but it can be determined that the software versions of the in-vehicle devices A to D are compatible, based on a compatibility table specified from the other compatibility tables. It is more preferable to employ a specifying method as indicated below, so as to improve the accuracy in specifying a proper compatibility table.

Initially, the compatibility information specifying unit 13 of the representative in-vehicle device A refers to the system numbers (system versions) of the compatibility tables Ta_cur to Td_cur obtained by the obtaining unit 12. Among the compatibility tables Ta_cur to Td_cur, the compatibility table Tb_cur has the latest system number "007". When the latest system number "007" does not match any of the system numbers "002", "003", and "004" of the other compatibility tables, the compatibility information specifying unit 13 determines whether the system number "007" and any of the system numbers "002", "003", and "004" of the other compatibility tables provide consecutive numbers. When the software version of each in-vehicle device is updated, upon updating of the vehicle control system 100, the latest compatibility table and any of the other compatibility tables are highly likely to be consecutive versions. The compatibility information specifying unit 13 determines that the compatibility table Tb_cur having the system number "007" is not a proper compatibility table, and specifies the compatibility table Tc_cur having the latest system number among the remaining compatibility tables Ta_cur, Tc_cur, and Td_cur, as the proper compatibility table.

Then, the determining unit 14 of the representative in-vehicle device A checks the software version of the representative in-vehicle device A, and the software versions of the other in-vehicle devices B to D obtained by the obtaining unit 12, against the compatibility table Tc_cur specified as the proper table, and determines whether the software versions of the in-vehicle devices A to D are compatible. In the example of FIG. 5, all of the software version "123" of the in-vehicle device A, software version "235" of the in-vehicle device B, software version "346" of the in-vehicle device C, and software *version* "457" of the in-vehicle device D coincide with the versions defined in the compatibility table Tc_cur. Accordingly, the determining unit 14 determines that the software versions of all of the in-vehicle devices A to D that constitute the vehicle control system 100 are compatible.

In the case shown in FIG. 5, the software versions of all of the in-vehicle devices A to D that constitute the vehicle control system 100 are compatible; therefore, vehicle control using the control functions of all of the in-vehicle devices A to D can be performed.

Figure 6:
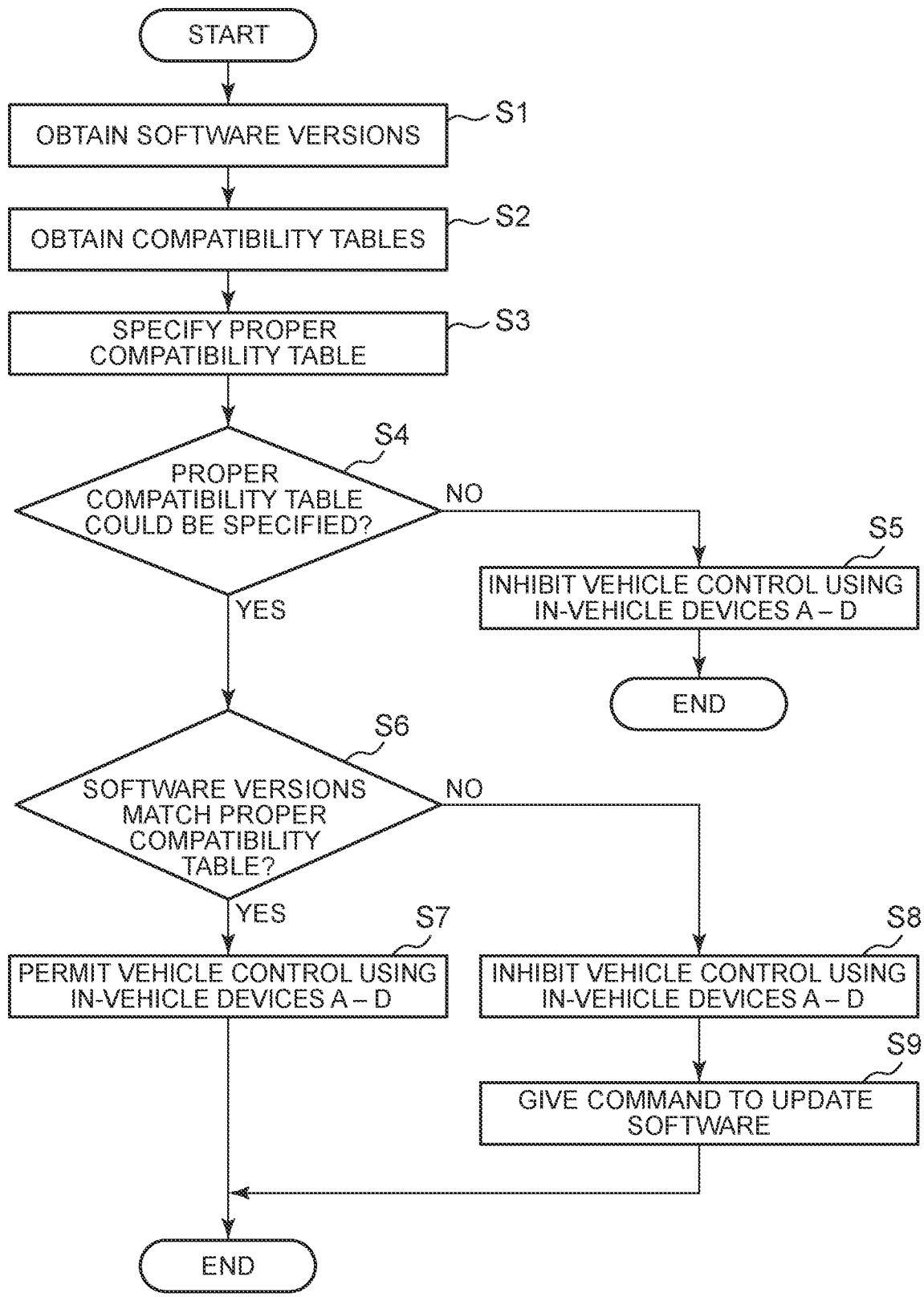
FIG. 6 is a flowchart illustrating one example of a control process performed by a representative in-vehicle device shown in FIG. 1.

Referring to FIG. 2 and FIG. 6, a control process performed by the representative in-vehicle device A will be described.

FIG. 6 is a flowchart illustrating one example of the control process performed by the representative in-vehicle device shown in FIG. 1.

In step S1, the obtaining unit 12 obtains the software versions of the other in-vehicle devices B to D. Then, the control proceeds to step S2.

In step S2, the obtaining unit 12 obtains the compatibility tables of the other in-vehicle devices B to D. Then, the control proceeds to step S3.

In step S3, the compatibility information specifying unit 13 specifies a proper compatibility table from among the compatibility tables obtained by the obtaining unit 12. Then, the control proceeds to step S4.

In step S4, the compatibility information specifying unit 13 determines whether the proper compatibility table could be specified from among the compatibility tables obtained by the obtaining unit 12. When an affirmative decision (YES) is obtained in step S4, the control proceeds to step S6. When a negative decision (NO) is obtained in step S4, the control proceeds to step S5.

In step S5, when the proper compatibility table could not be specified in step S4, the process of checking compatibility of the software versions of the in-vehicle devices A to D cannot be carried out. Accordingly, the determining unit 14 inhibits execution of vehicle control using the combination of the in-vehicle devices A to D, and finishes the process of FIG. 6.

In step S6, the determining unit 14 checks the software version of the representative in-vehicle device A, and the software versions obtained from the other in-vehicle devices B to D, against the proper compatibility table specified in step S3, and determines whether the software versions of the in-vehicle devices A to D are compatible. Also, when the determining unit 14 determines that the software versions of the in-vehicle devices A to D are not compatible, it specifies the in-vehicle device that holds software whose version does not match the version defined in the proper compatibility table. When an affirmative decision (YES) is obtained in step S6, the control proceeds to step S7. When a negative decision (NO) is obtained in step S6, the control proceeds to step S8.

In step S7, the determining unit 14 permits execution of vehicle control using the combination of the in-vehicle devices A to D, and finishes the process of FIG. 6.

In step S8, the determining unit 14 inhibits execution of vehicle control using the combination of the in-vehicle devices A to D. Then, the control proceeds to step S9.

In step S9, the update instructing unit 15 instructs the in-vehicle device that holds the software whose version does not match the version defined in the proper compatibility table, to update the software through communications with the external server 2. Then, the control finishes the process of FIG. 6.

The in-vehicle device instructed by the update instructing unit 15 to update software performs updating of the software and the compatibility table through communications with the external server 2, in a condition where the in-vehicle device is able to communicate with the external server 2. Instead of causing the in-vehicle device instructed by the update instructing unit 15 to update software, to directly communicate with the external server 2, the representative in-vehicle device A may communicate with the external server 2 to obtain updated software, and the update instructing unit 15 may be configured to instruct the in-vehicle device that holds the software of the incompatible version, to update its software with the updated software obtained by the representative in-vehicle device A.

The control process of FIG. 6 as described above may be implemented by a dedicated circuit, or may be implemented by causing a computer, such as an electronic control unit (ECU), having a processor, read-only memory (ROM), random access memory (RAM), hard disc, etc., to perform operation of each step. When the control process of FIG. 6 is performed by a computer, such as an ECU, a program that feasibly describes the control process may be stored in advance in a storage device, such as a ROM, or a hard disc, and the program may be read from the storage device, into a processor included in the computer.

When any of the in-vehicle devices A to D is replaced or repaired, or the software of any of the in-vehicle devices A to D is updated, the version of the software changes. However, in the vehicle control system 100 according to this embodiment, each of the in-vehicle devices A to D holds compatibility tables used for checking compatibility of the software versions, and the representative in-vehicle device A can autonomously check the compatibility of the software versions of the in-vehicle devices A to D, based on the proper compatibility table specified from among the compatibility tables held by the in-vehicle devices A to D. Thus, according to this embodiment, the vehicle control system 100 can check compatibility of the software versions, even in the case where the vehicle is not placed in an environment that permits wireless communications.

In the vehicle control system 100 according to this embodiment, each of the in-vehicle devices A to D holds the compatibility table of the current version, and the compatibility table of the old version, and the compatibility information specifying unit 13 of the representative in-vehicle device A specifies the proper compatibility table, from the compatibility tables of the two versions, i.e., the current and old versions, of each of the in-vehicle devices A to D. When the compatibility tables of the current and old versions are used for specifying the proper compatibility table, it is possible to determine the case where the compatibility table of the current version is older than the compatibility table of the old version. Accordingly, the proper compatibility table can be specified with high accuracy, in view of the update history of the compatibility table of each in-vehicle device.

Also, the vehicle control system 100 according to this embodiment includes the update instructing unit 15 that instructs the in-vehicle device having software whose version does not match that of the proper compatibility information, to update the software, when the determining unit 14 determines that the software versions of the in-vehicle devices A to D lack compatibility. With this arrangement, when it is determined that the software versions of all of the in-vehicle devices A to D that constitute the vehicle control system 100 lack compatibility, the vehicle control system 100 can be promptly brought back into a condition where the software versions of the in-vehicle devices A to D are compatible, through updating of the software of the incompatible version.

Also, in the vehicle control system 100 according to this embodiment, when the compatibility information specifying unit 13 cannot specify a proper compatibility table from among a plurality of compatibility tables, vehicle control implemented by the functions of all of the in-vehicle devices A to D is inhibited from being performed. Accordingly, when compatibility of the software versions of the in-vehicle devices A to D cannot be confirmed, it is possible to reduce the possibility of execution of unexpected vehicle control due to lack of compatibility among the software versions of the in-vehicle devices A to D.

While the latest compatibility table having continuity with other compatibility tables is specified as the proper compatibility table in the illustrated embodiment, the proper compatibility table may be determined by majority. When the proper compatibility table is determined by majority, the compatibility information specifying unit 13 may count the number of the same compatibility tables selected from the compatibility tables of the current versions of the in-vehicle devices A to D, and specify the compatibility table having the largest number, as the proper compatibility table. According to this method of specifying the compatibility table, compatibility information that is highly probable to be proper can be easily specified. The determining unit 14 determines whether the software versions of all of the in-vehicle devices A to D that constitute the vehicle control system 100 are compatible, based on the compatibility table specified as the proper table by the compatibility information specifying unit 13. When the determining unit 14 determines that the software versions of the in-vehicle devices A to D lack compatibility, the update instructing unit 15 instructs the in-vehicle device in question to update software. With this arrangement, it is possible to achieve compatibility among the software versions of all of the in-vehicle devices A to D that constitute the vehicle control system 100, based on the compatibility table selected by majority.

In the illustrated embodiment, it is preferable that the obtaining unit 12, compatibility information specifying unit 13, and determining unit 14 perform the process as described above each time the power supply of the vehicle is turned on. By confirming that the software versions of the in-vehicle devices A to D are compatible each time the power supply of the vehicle is turned on, it is possible to further reduce the possibility of execution of unexpected vehicle control due to lack of compatibility among the software versions of the in-vehicle devices A to D.

Also, in the illustrated embodiment, the compatibility information specifying unit 13 specifies one type of proper compatibility table from the comparability tables of the current versions and those of the old versions of the in-vehicle devices A to D. However, one type of proper comparability table may be specified from the comparability tables of the current versions of the in-vehicle devices A to D, without referring to the comparability tables of the old versions.

One aspect of the present disclosure may be utilized in a vehicle control system that implements predetermined vehicle control functions using a combination of a plurality of in-vehicle devices.

What is claimed is:

1. A vehicle control system of a vehicle, the vehicle control system comprising:
a plurality of in-vehicle devices installed in the vehicle and controlling motion of the vehicle, each in-vehicle device of the plurality of in-vehicle devices including a memory configured to store compatibility information including an allowable combination of software versions of the plurality of in-vehicle devices that constitute the vehicle control system, a first in-vehicle device of the plurality of in-vehicle devices includes a processor programmed to:
acquire software versions of other in-vehicle devices of the plurality of in-vehicle devices, and acquire compatibility information stored in the other in-vehicle devices of the plurality of in-vehicle devices, the compatibility information indicating current and prior software versions installed on each of the plurality of in-vehicle devices;
determine proper compatibility information from both (i) the compatibility information stored in the memory of the first in-vehicle device, and (ii) the compatibility information acquired from the other in-vehicle devices;
determine whether the software versions of the plurality of in-vehicle devices are compatible by comparing a software version of the first in-vehicle device and the specified software versions acquired from the other in-vehicle devices, against the proper compatibility information;

in response to determining that the software versions are compatible, execute the plurality of in-vehicle devices to operate on the respective software version determined to be compatible such that all of the plurality of in-vehicle devices function together and are not required to contact an external device for determining compatibility, which is external to the vehicle;

in response to the software version of the first in-vehicle device not being compatible with the specified software version of at least one in-vehicle device of the other in-vehicle devices, repeatedly determine a prior software version of the first in-vehicle device from the compatibility information stored in the memory until the specified software version is compatible with the specified software version of at least one in-vehicle device of the other in-vehicle devices; and execute the plurality of in-vehicle devices to operate on the respective software version determined to be compatible such that all of the plurality of in-vehicle devices function together and the accuracy of determining the compatible software version is increased by checking the prior software versions.

2. The vehicle control system according to claim 1, wherein:

each of the plurality of in-vehicle devices is configured to store compatibility information of a current version and compatibility information of an old version;

the processor is configured to obtain the compatibility information of the current version and the compatibility information of the old version from each of the other in-vehicle devices; and the processor is configured to determine the proper compatibility information based on the compatibility information of the current version and the compatibility information of the old version, which are stored in the memory of the first in-vehicle device, and the compatibility information of the current version and the compatibility information of the old version obtained from each of the other in-vehicle devices.

3. The vehicle control system according to claim 1, wherein the processor is configured to determine a latest compatibility information as the proper compatibility information, the latest compatibility information being included in the compatibility information stored in the memory of the first in-vehicle device, and the compatibility information obtained from the other in-vehicle devices.

4. The vehicle control system according to claim 1, wherein the processor is configured to determine a most frequent compatibility information as the proper compatibility information, the most frequent compatibility information being the same compatibility information most often included in the compatibility information stored in the memory of the first in-vehicle device, and the compatibility information obtained from the other in-vehicle devices.

5. The vehicle control system according to claim 1, wherein the processor of the first in-vehicle device is further configured to instruct any of the plurality of in-vehicle devices having software of a version that does not match the proper compatibility information, to update the software, upon determining that the software versions of all of the in-vehicle devices that constitute the vehicle control system are not compatible.

6. The vehicle control system according to claim 1, wherein the processor is configured to perform a determining process each time a power supply of a vehicle is turned on.

7. A method of checking compatibility of software used in a vehicle control system of a vehicle including a plurality of in-vehicle devices installed in the vehicle and controlling motion of the vehicle, the method comprising:

storing in advance, by a computer of each of the in-vehicle devices, compatibility information including an allowable combination of software versions of all of the in-vehicle devices that constitute the vehicle control system;

acquiring, by a computer of a first in-vehicle device of the plurality of in-vehicle devices, software versions of the other in-vehicle devices, and compatibility information stored in the other in-vehicle devices, of the plurality of in-vehicle devices, the compatibility information indicating current and prior software versions installed on each of the plurality of in-vehicle devices;

determining, by the computer of the first in-vehicle device, proper compatibility information from both (i) the compatibility information stored in the first in-vehicle device, and (ii) the compatibility information acquired from the other in-vehicle devices;

determining, by the computer of the first in-vehicle device, whether the software versions of the plurality of in-vehicle devices are compatible by comparing a software version of the first in-vehicle device and the specified software versions acquired from the other in-vehicle devices, against the proper compatibility information;

in response to determining that the software versions are compatible, executing the plurality of in-vehicle devices to operate on the respective software version determined to be compatible such that all of the plurality of in-vehicle devices function together and are not required to contact an external device for determining compatibility, which is external to the vehicle;

in response to the software version of the first in-vehicle device not being compatible with the specified software version of at least one in-vehicle device of the other in-vehicle devices, repeatedly determining a prior software version of the first in-vehicle device from the compatibility information stored in the memory until the specified software version is compatible with the specified software version of at least one in-vehicle device of the other in-vehicle devices; and executing the plurality of in-vehicle devices to operate on the respective software version determined to be compatible such that all of the plurality of in-vehicle devices function together and the accuracy of determining the compatible software version is increased by checking the prior software versions.

8. The vehicle control system according to claim 2, wherein the processor is programmed to determine that the compatibility information of the current version is proper when a version of the compatibility information of the current version is newer than a version of the compatibility information of the old version.

* * * * *